April 21, 1970  P. KUHNLE  3,507,095
MACHINE FOR MAKING, FILLING AND CLOSING PACKAGING CONTAINERS
Filed Feb. 9, 1968  2 Sheets-Sheet 1

United States Patent Office 3,507,095
Patented Apr. 21, 1970

3,507,095
MACHINE FOR MAKING, FILLING AND CLOSING PACKAGING CONTAINERS
Paul Kuhnle, Winnenden, Wurttemberg, Germany, assignor to Fr. Hesser Maschinenfabrik Aktiengesellschaft, Stuttgart-Bad Cannstatt, Nauheimer, Germany, a corporation of Germany
Filed Feb. 9, 1968, Ser. No. 704,367
Claims priority, application Germany, Feb. 20, 1967, H 61,899
Int. Cl. B65b 1/02
U.S. Cl. 53—183                                    1 Claim

ABSTRACT OF THE DISCLOSURE

A high-output packaging machine comprising a pair of package-making mandrel wheels arranged side by side and rotating in vertical planes, and a horizontal conveyor served by the two mandrel wheels and transporting the packages through filling and closing stations. An inclined intermediate conveyor plate may be used between each mandrel wheel and the horizontal conveyor to transfer packages from the former to the latter.

---

This invention relates to a machine for making, filling and closing packaging containers of packaging materials of selected type, equipped with intermittently rotating shaping mandrels.

Known machines of this character are provided with a plurality of folding mandrels which rotate about a vertical or horizontal axis and around which blanks are successively folded, the tubular articles so formed being closed at one side. This method of manufacture has the advantage that the packaging material is carefully handled and that the containers are given the prescribed physical configuration before they are filled.

A disadvantage of machines of this kind equipped with mandrel wheels is however that, because of the intermittent operation, the maximum output is less than in the case, for example, of machines which start with premade containers, for example lined or unlined folding boxes.

The aim of this invention is to overcome this drawback and present a machine in which not only is the upper output limit substantially higher, but in addition is suited particularly well for the manufacture of liquid-filled packages which, in particular, demand a uniform feed between filling and closing to positively prevent any spilling over of the liquid or wetting by the liquid of areas which are later to become sealing zones.

In pursuance of this aim, the machine according to the present invention comprises the combination of at least two shaping mandrel wheels which are rotatable intermittently in vertical planes, a conveyor device arranged to circulate continuously in a horizontal plane, with a package-filling device and a package-closing device arranged along the path of travel of said horizontal conveyor device, and an intermediate conveyor associated with each of said mandrel wheels for transferring packaging containers made on the mandrels of said wheels to receptacles on said conveyor device.

A preferred embodiment of the machine according to the invention will now be described with reference to the accompanying diagrammatic drawings, in which.

Figure 1:
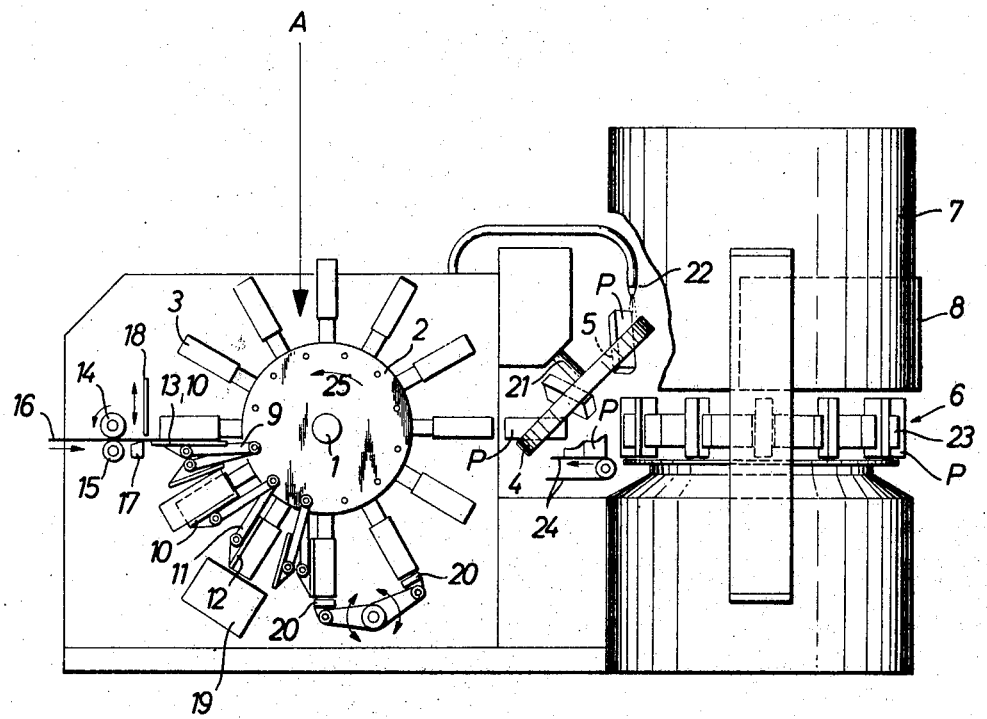
FIGURE 1 is a front view of the machine according to the invention.
Figure 2:
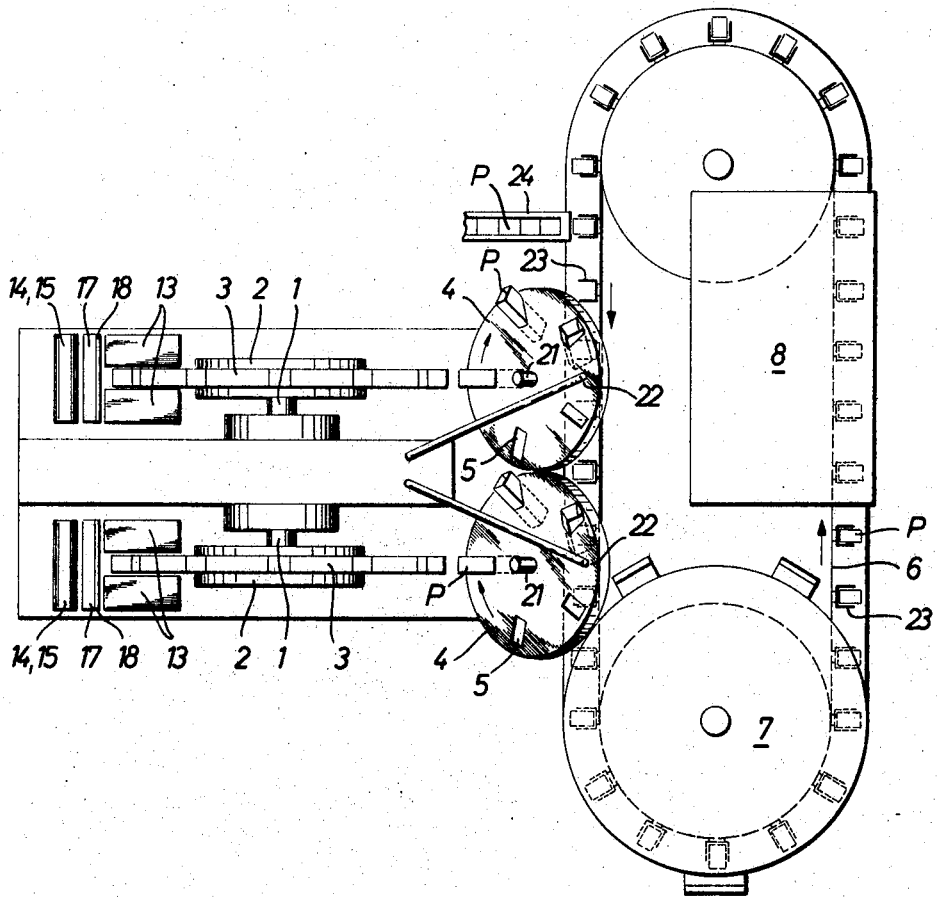
FIGURE 2 is a plan of the machine illustrated in FIGURE 1.

The machine in this example of the invention primarily comprises two devices for making the packaging containers P, these devices comprising wheels 2 which are mounted on a common shaft 1, have radial folding mandrels 3, and are driven so as to rotate intermittently in a vertical plane in known fashion. The machine further comprises two intermediate transfer plates 4 which are arranged one next to each of the wheels 2 and which have pockets 5 for receiving packaging containers P from the latter, and a conveyor device 6 which circulates in a horizontal plane, with a filling device 7 and a closing device 8 arranged along the path of travel thereof.

Associated with the folding mandrels 3 are holding plates 10, which are movable in the direction of rotation of the mandrels through the agency of press levers 9, and dies 12, mounted on press levers 11 and movable oppositely to this direction of rotation, for applying a longitudinal seam under pressure. Part only of these levers, plates and dies are illustrated in FIGURE 1 to assist comprehension.

Since the two devices for making the packaging containers P, which incorporate the folding mandrels and turn intermittently in unison, are of similar and mirror-image construction, one only of them will now be described.

Two folding tables 13 are arranged at the opposite sides of the path of rotation of the folding mandrels 3 of each wheel. The leading end of a continuous strip 16 of packaging material, withdrawn from a supply reel (not shown), is fed on to these folding tables 13 by means of two feed rollers 14, 15, and a section of predetermined length is severed therefrom by means of a cutting device comprising a bottom knife 17 and a movable top knife 18. During the movement of the packaging material on to the folding tables 13 one holding plate 10 is disposed at the level of the latter. The folding mandrel 3 corresponding to this holding plate 10 is now moved between the folding tables 13, and the aforesaid holding plate 10 is forced by the press lever 9 against the underside of the folding mandrel 3 whereby the severed blank of packaging material between the mandrel and the holding plate is, without being displaced, wrapped U-fashion around the mandrel 3.

During the succeeding period of arrest of the folding mandrel 3, the folding of the blank of packaging material around the mandrel is completed so that it assumes a tubular form, and the longitudinal margins of this blank of packaging material, which have been brought together, are united with one another in known fashion by a longitudinal seam. This longitudinal seam can be made by adhesive or heat sealing, depending on the packaging material which is used, and can also be subsequently compacted by a die 12.

A device 19 of known type, for example that described in U.S. Patent No. 2,677,223 is provided at the next station for forming a bottom closure on the tube of packaging material. This bottom closure, which may either be cemented or heat sealed, can be consolidated by pressing with a known type of die 20.

Single thickness packaging containers, for example bags of multi-layer foils, made in the manner described are often provided with a protective carton. In these instances, the folding devices 13, 19, 20 are offset in opposition to the direction of rotation of the folding mandrels 3 and the strip 16 of packaging material for formation of the bags is fed to the station indicated by arrow A in FIGURE 1. Mechanisms of similar construction to the folding devices 13, 19 and 20 are then arranged after the latter to be used for making the protective carton. It is of course also possible to arrange two groups of folding devices 13, 19, 20 in succession along the path of travel of the folding mandrels 3 for the production of double-walled bags.

The devices with the folding mandrels 3 may be arranged to rotate in a direction opposite to that indicated by the arrow 25 in FIGURE 1, particularly in the case of the manufacture of single-walled packaging containers P. This has the advantage that the folding devices 13, 19 and 20 can then be at the eye level of the machine attendant and readily accessible. The second named arrangement, in which the packaging material is fed in above the folding mandrels 3 is of particular advantage where lapped foils are handled.

The finished packaging containers P are then withdrawn from the folding mandrels 3 of the two wheels 2 and pushed into the pockets 5 of transfer plates 4, for example with the pneumatic assistance of a blast of air from the ends of mandrels 3.

The transfer plates 4 are of known form and intermittently rotatable, and their rotary spindles 21 are inclined to the vertical; the pockets 5 in each of these transfer plates 4 are arranged along the superfices of an imaginary cone whose apex coincides with the rotary axis of the plate concerned, in such a way that the packaging containers inserted in the pockets 5 pass over the conveyor device 6 with their longitudinal axes vertical. They are then passed, with the assistance of air from nozzles 22, into the continuously moved conveyor holders 23 of the chain conveyor device 6.

The conveyor device 6 can, within the scope of this invention, be differently constituted, again in known fashion, as an endlessly circulating belt, preferably of metal, which is provided with flights or other impelling devices at predetermined intervals.

The packaging containers P inserted into the conveyor holders 23 are then filled in known fashion, without varying the speed of travel of the conveyor device. This may, for example, be accomplished by using a circulating dispensing device indicated at 7 of known form, for instance as described in U.S. Patent No. 2,942,761 or using known travelling weighers. The filled packages are closed by means of a known form of closing mechanism 8, for example that described in U.S. Patent No. 2,729,928.

The finished packages P are then pushed out of the conveyor holders 23 and carried away from the machine by means of a conveyor belt 24.

Instead of use of transfer plates 4 of the form described, it is also possible within this invention to use other known forms of conveyor means for transferring the packaging containers P to the conveyor device 6.

I claim:
1. A machine for making, filling and closing packaging containers made of packaging materials of any chosen kind, this machine being equipped with intermittently-rotatable shaping mandrels, characterized by the combination of at least two shaping mandrel wheels which are rotatable intermittently in vertical planes, a conveyor device arranged to circulate continuously in a horizontal plane, with a package-filling device and a package-closing device arranged along the path of travel of said horizontal conveyor device, an intermediate conveyor associated with each of said mandrel wheels for transferring packaging containers made on the mandrels of said wheels to alternate receptacles on said conveyor device, said intermediate conveyor consisting of a transfer plate with a plurality of pockets mounted on an intermittently-rotatable axis which is inclined to the vertical, said pockets being arranged to receive the packaging containers from said mandrel wheels and to transfer them to receptacles in said conveyor device during the steps of conveyor travel, and means for transferring said containers from said intermediate conveyor to said conveyor device.

References Cited
UNITED STATES PATENTS

| 3,322,043 | 5/1967 | Vergobbi | 93—44.1 X |
| 3,378,128 | 4/1968 | Stevenson et al. | 93—53 X |

FOREIGN PATENTS

| 771,072 | 3/1957 | Great Britain. |
| 920,146 | 3/1963 | Great Britain. |

TRAVIS S. McGEHEE, Primary Examiner

U.S. Cl. X.R.

93—44.1